US008049346B2

(12) United States Patent
Kitch

(10) Patent No.: US 8,049,346 B2
(45) Date of Patent: Nov. 1, 2011

(54) RELIABILITY AND SERVICEABILITY ENHANCED ENGINE DRIVEN ELECTRICAL GENERATING SYSTEM

(76) Inventor: Timothy Blair Kitch, Lake Oswego, OR (US)

( * ) Notice: Subject to any disclaimer, the term of this patent is extended or adjusted under 35 U.S.C. 154(b) by 246 days.

(21) Appl. No.: 12/583,480

(22) Filed: Aug. 20, 2009

(65) Prior Publication Data

US 2011/0042964 A1 Feb. 24, 2011

(51) Int. Cl.
*F02B 63/00* (2006.01)
*H02K 5/00* (2006.01)

(52) U.S. Cl. ........................................... 290/1 A; 123/2

(58) Field of Classification Search .................. 290/1 A; 123/3
See application file for complete search history.

(56) References Cited

U.S. PATENT DOCUMENTS

| | | | | |
|---|---|---|---|---|
| 4,476,395 | A * | 10/1984 | Cronin | 290/6 |
| 4,698,975 | A * | 10/1987 | Tsukamoto et al. | 60/721 |
| 4,831,277 | A * | 5/1989 | Christopher | 290/1 A |
| 4,871,922 | A * | 10/1989 | Heinrich et al. | 290/1 B |
| 5,623,531 | A * | 4/1997 | Nilssen | 379/56.2 |
| 5,642,702 | A * | 7/1997 | Kouchi et al. | 123/198 E |
| 5,731,687 | A * | 3/1998 | Hirano et al. | 322/1 |
| 5,899,174 | A * | 5/1999 | Anderson et al. | 123/2 |
| 5,929,611 | A * | 7/1999 | Scott et al. | 322/46 |
| 6,784,560 | B2 * | 8/2004 | Sugimoto et al. | 290/1 R |
| 7,193,333 | B1 * | 3/2007 | Kitch | 290/1 A |

FOREIGN PATENT DOCUMENTS

JP 11343859 A * 12/1999

* cited by examiner

*Primary Examiner* — Joseph Waks
(74) *Attorney, Agent, or Firm* — Mark S. Hubert

(57) ABSTRACT

A engine driven electrical generating system and its support cradle for use in confined space enclosures with a triple redundant troubleshooting system, a triple redundant troubleshooting data transmission system, and a double redundant electric fan cooling system wherein the most common modes of motor or generator failure can be repaired quickly and easily with the genset in situ. With the most common mode of failure for a genset being overheating, enhanced fan monitoring and replacement systems have been incorporated.

10 Claims, 6 Drawing Sheets

RELIABILITY AND SERVICEABILITY ENHANCED ENGINE DRIVEN ELECTRICAL GENERATING SYSTEM

BACKGROUND OF THE INVENTION

The present invention relates to a extremely diagnostic and repair friendly compact EPA certifiable gasoline, liquid propane gas (LPG), natural gas (CNG) or dual fuel engine driven electrical generating system (a "genset") that is housed in a motorcoach compartment Specialty motorcoaches, like traveling medical or dental facilities, have high power output gensets that accumulate a plethora of working hours in a relatively short period of time. The operation of the genset is critical as the genset's output is required to operate the medical devices housed in the motorcoach. Simply stated, if the genset is not operational the entire medical facility is useless. Since many of these motorcoaches are used in remote countries and locations, a competent genset repair person is not always nearby. This genset and its cradle have been designed to compensate for these weak points of a genset system.

This new invention utilizes and combines known and new technologies in a unique and novel configuration to overcome the aforementioned problems.

SUMMARY OF THE INVENTION

The general purpose of the present invention, which will be described subsequently in greater detail, is to provide a new genset and support cradle that is able to fit into a size restricted enclosure of approximately 12.8 cubic feet and provide enhanced troubleshooting capabilities, cooling capabilities and ease of repair. It has many of the advantages mentioned heretofore and many novel features that result in a new genset which is not anticipated, rendered obvious, suggested, or even implied by any of the prior art, either alone or in any combination thereof.

In accordance with the invention, an object of the present invention is to provide an improved motorcoach genset and cradle capable of redundant troubleshooting analysis and redundant methods of obtaining and transmitting the troubleshooting data.

It is another object of this invention to provide an improved genset and support cradle capable of enhanced cooling to the compartmentally enclosed genset as well as ease of installation and alignment of the unit within the genset compartment.

It is a further object of this invention to provide a system of cooling redundancy and fan monitoring as well as easy access to commonly failing components.

It is still a further object of this invention to provide for a genset that allows for the replacement of either or both cooling fans, quickly, easily and in situ.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
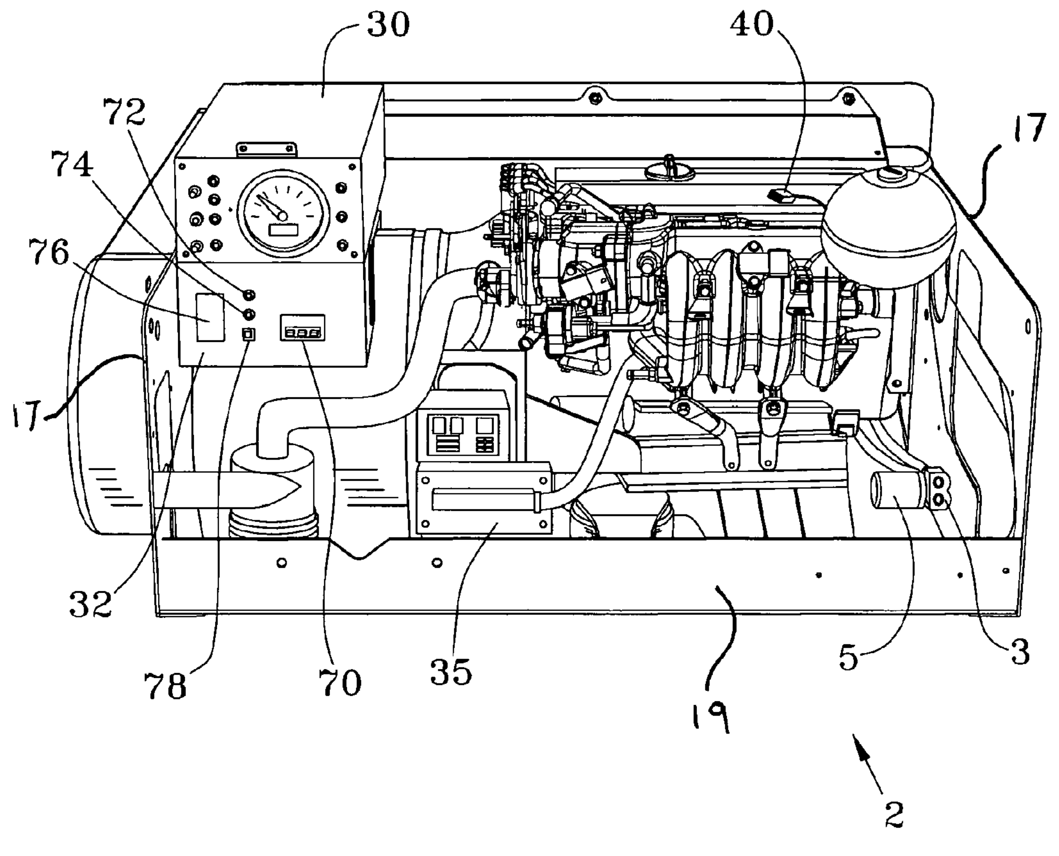
FIG. 1 is a front perspective view of the genset in the genset cradle showing the general arrangement of all components.

The improved genset was invented to solve the following three items: the most common failure modes; the most common diagnostic problems and the most troublesome service issues.

The most common failures are overheating of the engine or generator windings because of inadequate cooling capacity, cooling fan failure, failure of the engine start relay, failure of the generator AC voltage regulator, and premature engine component breakdown and wear due to inadequate lubrication. The most common diagnostic problems are improper diagnosis not because of failed sensors but rather because of failed or out of calibration sensor signal indicators. The most common service problem is ignored servicing or replacement of worn parts that reside in troublesome locations to access and require a mechanic to remove the genset from the motorcoach.

Pancake style generators are known for their short longitudinal axis style bodies. Here, to accommodate tight space configurations, the front (fan side) of a pancake generator is directly coupled to the back (flywheel end) of a conventional (driver) engine to form a "genset". As can be expected from any partially enclosed heat generating device, failures due to a lack of cooling abound. To enable diagnostic troubleshooting, minimize these cooling failures and simplify the repair of common failure modes in a genset, the system as discussed herein was invented.

The industry standard dimensions for a genset to be mechanically affixed to the chassis/undercarriage of a motorcoach so as to fit in a genset compartment is approximately 34 inches (plus or minus ¾ of an inch) in length by 26 inches in height by 25 inches in depth. This is the maximum size that the cradle 9 that housed the genset can be. The length of the genset is 36 and ⅝ inches and cutouts in the cradle 9 allow part of the genset to extend outside the cradle. Although the 34 inch length limitation discussed above is determined by the motorcoach's aesthetic appearance, slideouts and frame design, there is slightly more length behind the motorcoach's body panels and the genset compartment door. This allows the 34 inch long cradle to hold and support inch long genset and still fit into the genset compartment.

The low emission, single side access engine driven electrical generating system of the present invention, (hereinafter "genset"), comprises a four-stroke four cylinder combustion engine directly coupled to a pancake style electrical generator, capable of delivering from 12.5 KW to 17 KW at 120/240 VAC (70/70 Amp) at 60 Hz while fast idling at an 1800 rpm engine speed. Idling speed ranges between 900 and 1200 RPM. The entire genset assembly 2 which includes the cradle 9 remains able to be fit into a space approximately 34 inches long, 25 inches deep and 26 inches high. It is to be noted that a 2010 EPA emissions compliant gas engine will be capable of delivering from 13 KW to 20 KW at 120/240 VAC (80/80 Amp) at 60 Hz at a fast idle.

Looking at FIG. 1 the service and diagnostic unit (SDU) can best be seen located at the front of the genset and cradle assembly 2 and above the pancake generator. It is affixed mechanically to the cradle assembly 2. The SDU is made up of a stacked configuration of a DC status module 30 and an AC status module 32. The SDU receives signals from various engine and generator sensors, the engine's computer (ECU) 35, the fan test circuit, the main output AC breakers 70, the voltage regulator and voltage regulator breaker 78. The oil filter 3 housing 3 has been located to the forefront of the cradle 9 for ease of the oil filter 5 replacement.

Looking at FIGS. 2-5 genset cradle 9 and cooling circuit components can best be seen. A set of two, dual speed electric cooling fans 4 and 7 have been located on a removable panel 6 that mechanically engages to the cradle back plate 13. Either fan alone is capable of sufficiently cooling the circulating water in the genset's radiator. Although designated primary fan 7 and secondary fan 4, they are identical. With either of the two fans 4 and 7 operating, the genset can idle at full load indefinitely in a desert environment up to 130° F. The fans 4 and 7 have a diagnostic circuit incorporated into the DC status module 30 of the SDU. The fan wiring 23 incorporates electrical plug connectors 24 located on the back side of the fans. (The wiring and electrical plug connector for the secondary fan 4 has been eliminated for purposes of visual clarity but is identical to their counterparts on the primary fan 7.) The fans are wired in an electrically parallel configuration.

The cradle 9 has a bottom plate or face 15, two side plates 17, a lower front plate 19 and a back plate 13.

Figure 3:
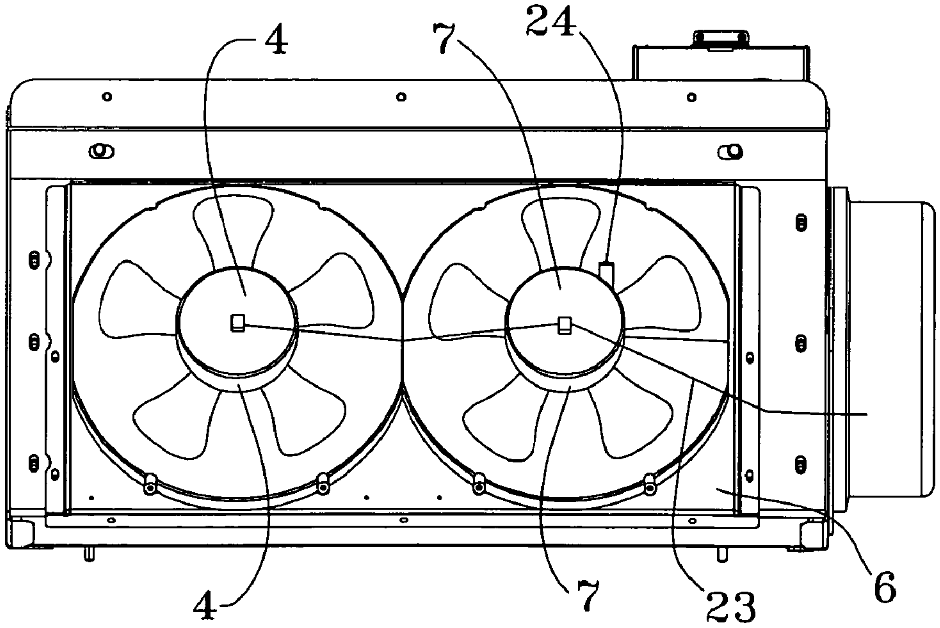
FIG. 3 is a back side view of the genset cradle and fan assembly.
Figure 4:
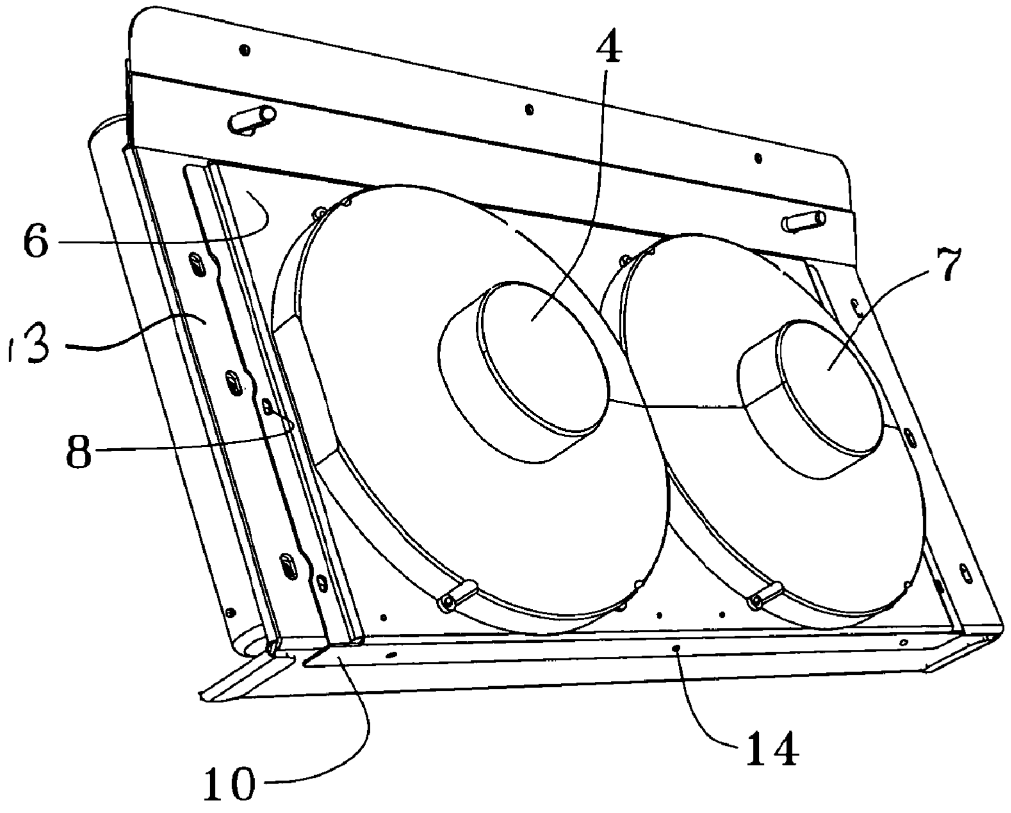
FIG. 4 is a perspective view of the fan assembly attached to the genset cradle rear mounting plate.
Figure 6:
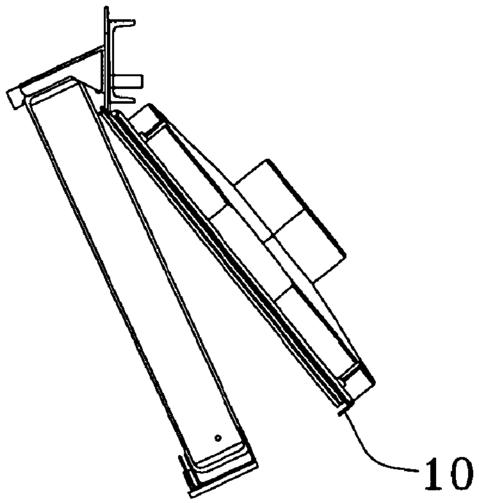
FIG. 6 is a side view of the fan assembly partially removed from the genset cradle.
Figure 7:
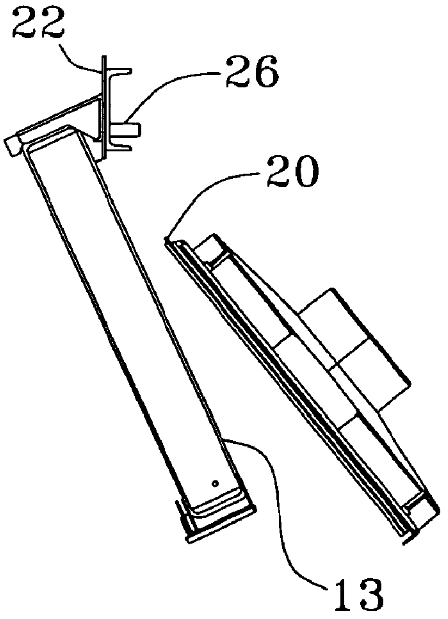
FIG. 7 is a side view of the fan assembly fully removed from the genset cradle.

Looking at FIG. 3 it can be seen that the set of cooling fans 4 and 7 have been located on a planar removable panel 6 with sets of oblong orifices that engage sets of locking tabs 8 on the back plate 13 of the cradle 9. The removable panel 6 has a bottom flange 10 that extends normally from the bottom edge of the panel 6 having orifices therethrough to accommodate mechanical retaining fasteners 14 that connect the panel 6 to the bottom plate 15 of the cradle 9. The panel 6 also has a small top flange 20 that engages behind the upper rear flange 22 of the cradle 6. This physical configuration allows a service person to slide under the genset and cradle assembly 2 and remove the retaining fasteners 14, slide the panel 6 downward until the oblong orifices are not obstructed by the locking tabs 8 and the top flange 20 is clear of the upper rear flange 22, and then remove the panel 6 with both fans 4 and 7 intact. At this time the electrical plugs 24 can be disconnected and the fan and panel assembly taken to another location for troubleshooting. To repair a fan (which generally is the replacement because of the low cost of the fan units) the service person need only unbolt the fan retaining bolts 30 and remove the broken fan. The removal of the panel 6 is accomplished while the genset and cradle assembly 2 remain connected to the motorcoach. The dimensions of the genset cavity and the genset cradle 9 are such that there is ample space to accomplish such an operation. A replacement fan is installed following the reverse procedure. FIGS. 6 and 7 show various stages of the panels removal.

Figure 2:
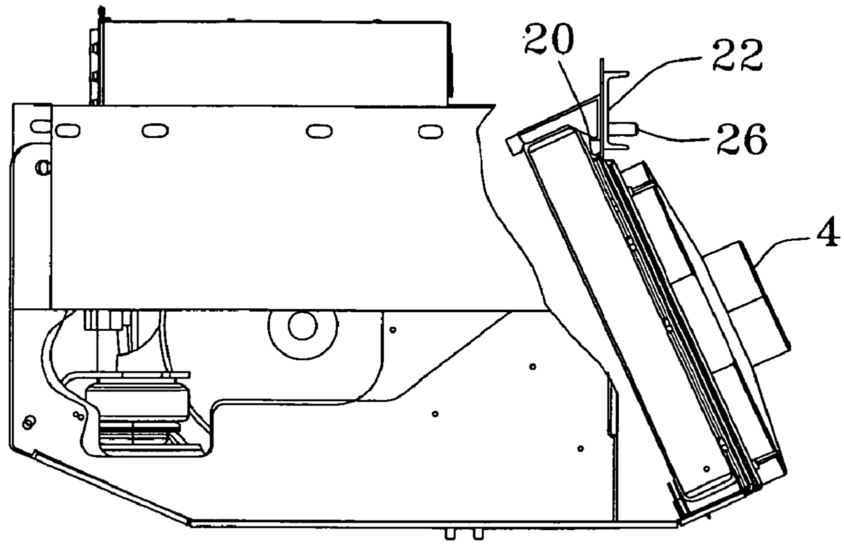
FIG. 2 is an engine side partial cutaway view of the genset and genset cradle.
Figure 5:
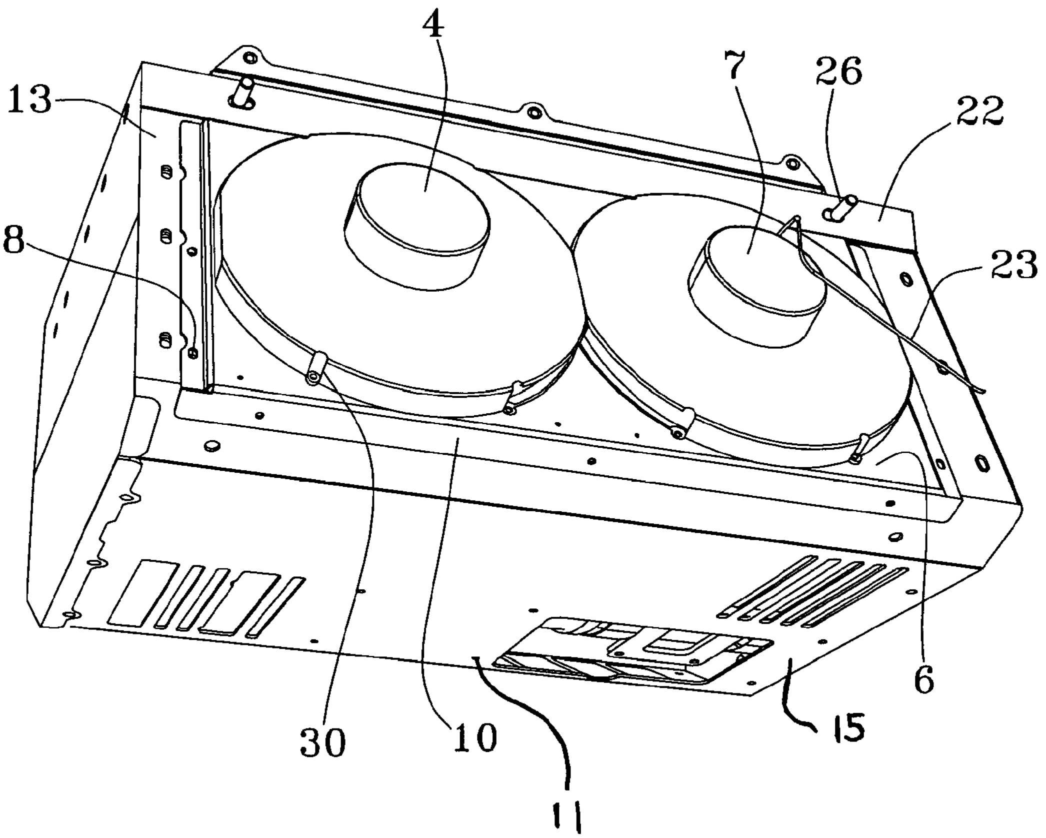
FIG. 5 is bottom rear perspective view of the genset in the genset cradle.

Looking at FIGS. 2 and 5 The upper rear flange 22 of the cradle 9 has a pair of cradle support and locating studs 26 that make for ease of removal and installation of the genset and cradle assembly 2 into the motorcoach's generator cavity, which has a mounting alignment bracket (not shown) with matingly conforming orifices. If a major repair requires the genset be removed from the motorcoach, after the disconnection of the necessary electrical wires, the nuts removed from the two locating studs 26 located on the motorcoach's chassis, the bottom face 15 of the cradle 9 may be hydraulically lifted with a transmission jack and slid inwardly until the stud orifices clear the locating studs 26. There are a set of threaded transmission jack orifices 11 formed in the bottom face 15 of the cradle 9 that allow the attachment of a transmission jack to the cradle 9 for lowering of the genset and cradle assembly 2. The locating studs 26 serve to guide into alignment the genset and cradle assembly 2 when it is reinstalled. This simplifies the installation when one person is working alone.

Each fan has two speeds. The first speed is achieved by the application of a divided 12 volt DC power so as to provide 6 volts DC to each fan. When the water temperature in the cooling circuit reaches 185° F. a water temperature thermoswitch grounds to the genset's engine block to actuate and close a normally open high speed relay that no longer divides the voltage to the two fans and applies a full 12 volts DC to each fan, increasing the speed of the fans and increasing the heat removal capacity of the cooling system.

All engine sensors are routed to the genset's computer (ECU) 35. These include but are not limited to sensors for: catalytic convertor failure; engine torque; air filter failure; ignition failure; oil pressure; oil temperature; water temperature; engine speed; air intake temperature; battery voltage; engine hour meter; engine coil continuity; manifold absolute pressure (MAP); O2 level; exhaust gas temperature; fuel temperature and fuel pump circuit continuity. The input signals presented to the ECU from these sensors are converted into a different electronic format (digital and analog) and processed as output signals representing the monitored parameter. These output signals may also be a diagnostic trouble code generated by the ECU in preprogrammed response to one or more of the input signal values as is well known in the industry. The ECU output signal is delivered to both the DC status module 30 of the SDU and to a conventional OBD II port 40. This provides a trace of all of the operating parameters of the genset's engine at the engine RPM or load level selected. The OBD II port 40 has been routed to the front of the motor and is wired to an onboard computer inside the motorcoach that is configured with the appropriate decoding software and firmware to interpret the protocol for the diagnostic code signals and displays the desired parameters through its graphic interface. The OBD II port 40 can also be connected to a signal converter for that signal protocol, in series with a cell phone such that the converted signal may be sent wirelessly to a remote computer with a modem. (not illustrated) The OBD II port 40 may also be connected to a diagnostic trouble code (DTC) reader (scanner) that will display the diagnostic codes.

Uplink capabilities to relay this data can be accomplished in the following three ways: via satellite from the onboard computer; via a cell phone relay from the onboard computer or directly from the cell phone connected to the OBD II port. It is important to note that each genset is precisely tuned and optimized at the factory after assembly. There are minor differences in the performance characteristics between each genset. Each genset is optimally tuned balancing efficiency with emission control. The performance characteristics and adjustments made to optimize each discrete genset are digitally stored at the factory in their computer system. The signal of the trace of the operating parameters sent from the genset in the field, whether it be sent via satellite from the onboard computer, via a cell phone relay from the onboard computer or directly from a cell phone connected to the OBD II port, is compared to the original factory trace of all of the operating parameters of that genset's engine when it was optimally tuned. This aids the technician at the factory in returning the genset's engine to its optimal configuration.

Figure 8:
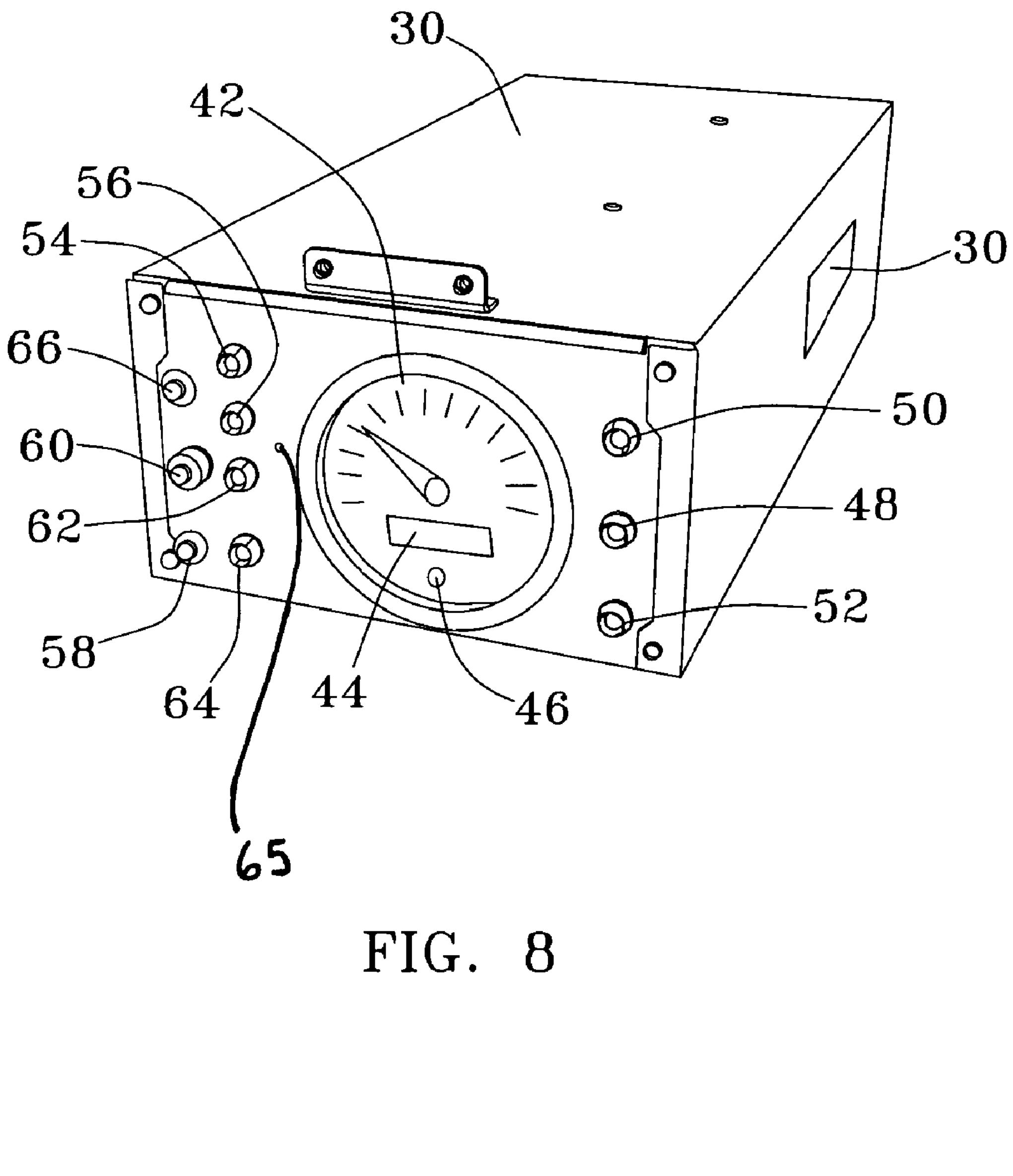
FIG. 8 is a front view of the VDO dual indication troubleshooting unit.

The signal output sent from the ECU 35 to the DC status module 30 may be viewed in several ways, both digitally and in analog format outputs. Looking at FIG. 8 it can be seen that a sweep scale analog tachometer 42 indicates the engine speed. A digital display 44 shows the engine speed numerically. Display pushbutton 46 may be depressed and released to cycle through a display of the following select engine parameters: oil pressure; coolant temperature; air intake temperature, battery voltage; engine rpm; engine torque; oil temperature and total engine operating hours.

If there is a problem with the engine a red warning light will illuminate in the digital display 44. The display pushbutton 46 may be held in the depressed position to display any diagnostic trouble codes in the digital display 44. This displayed code can be referenced to a fault code list to further diagnose the problem as is well known in the industry.

If the tachometer 42 and or digital display 44 are faulty the engine malfunction light 48 will begin to flash out the sequence of the numbers for the diagnostic code (as is well known in the industry.) If the ECU 35 malfunctions the ECU failure light 50 will illuminate. Also, if the alternator fails the alternator malfunction light 52 will illuminate. The battery power light 54 will illuminate to indicate that there is battery power available. The fuel pump status light 56 illuminates to indicate if there is power to the fuel pump. (This should be illuminated only when the engine is operating.)

A fan test circuit is also incorporated into the DC status module 30. This allows the individual testing of the primary fan 7 and secondary fan 4 at the 6 volt low speed operation and the 12 volt high speed operation. The test circuit only tests the electrical power availability up to the fan motors. The service person will have to verify if the fans actually start and rotate the blades when this test is performed. The fan test circuit does not indicate if there is a broken motor, fan blade etc.

A toggle switch 58 allows the selection of the primary or secondary fan. Depressing the fan test button 60 puts power to the fan selected and if there is power to the fan selected either of the primary fan power light 62 or secondary fan power light 64 will illuminate. A two way power toggle switch 66 switches the available power to the selected fan between 6 volts and 12 volts.

Lastly there is a reset orifice 65 on the DC status module 30 that provides for the insertion of a paper clip so as to allow a technician be able to reset (or rephase) the latching DC engine start relay. This relay is one of the more common components for failure in a genset. There is also an access panel on the DC status module 30 that opens to allow the replacement of the latching DC engine start relay.

The AC status module 32 (FIG. 1) houses the AC main breakers 70 for the generator output AC power as well as an AC power output after breaker indicator light 72 and an AC power to main breaker light 74. It also has an access panel 76 that houses a plug in AC voltage regulator module (not visible). A voltage regulator resettable breaker 78 is also located on the panel.

In operation, the present invention has been designed to allow troubleshooting in remote locations without a plethora of diagnostic equipment. With its' three methods of relaying data (one through a satellite link, and two through a wireless cell phone) the appropriate trouble codes and diagnostic information of the discrete genset engine can be quickly sent to the manufacturer's computer system where it can then be compared to the original factory engine parameters for that discrete genset that were recorded when it left the factory as a brand new genset.

The triple redundant method of accessing the engine parameters (via the digital display readout, via the digital display numeric error codes, or via the error code light flashing) allows a person at the site three ways to troubleshoot a problem even if an OBD II scanner is not available or if the onboard computer is not in service. The triple redundancy allows the digital display 44 to fail as well as the ECU 35 and yet the troubleshooting codes can be retrieved. It also signals the person that the ECU 35 is malfunctioning, and acts as a check against the individual sensor's calibration and operation.

The fans 4 have a diagnostic test circuit located on the front side of the motor. A three position toggle switch allows either of the fans to be independently started. When either fan is selected for starting a power status light illuminates indicating if there is electrical power up to the fan motor. The actual validation of the fan starting must be done audibly, visually or by air pressure sensation by the operator. Hence, an illuminated power status light and a running fan would be a successful test whereas a non illuminated power status light and non running fan would indicate a problem with the power or the power connection to the fan, and a non illuminated power status light and a running fan would indicate a problem with the status light or circuit. An illuminated status light and a non running fan would indicated jammed or, seized fan or a broken fan motor.

The DC power to start the genset 2 is drawn from a dedicated genset battery. However, when necessary the dedicated genset battery may be switched so as to supplement the battery bank of the motorcoach via an isolation switch as is well known in the industry. Thus depleting the batteries of the motorcoach by accessories will not prevent the coach's or genset's ability to start.

The reliability and serviceability enhanced engine driven electrical generating system as described above dramatically reduces the down time due to the most common failure modes and allows quick, easy diagnostics to be performed by a competent service person at a remote location from the disabled vehicle.

The above description will enable any person skilled in the art to make and use this invention. It also sets forth the best modes for carrying out this invention. Numerous variations and modifications thereof will also remain readily apparent to others skilled in the art, now that the general principles of the present invention have been disclosed.

Having thus described the invention, what is claimed as new and desired to be secured by Letters Patent is as follows:

1. A portable genset, for use in a front side accessible confined enclosure comprising an engine mechanically coupled to an electrical generator, wherein said genset comprises;

- a support cradle which is adapted for mechanical connection to the frame of a motorcoach, and which is mechanically connected to and supports said conjoined engine and generator within said confined enclosure and which has at least two locating tabs and one locating flange extending from a back face of said cradle and at least one threaded recess formed therein said back face;
- a double redundant electric fan cooling system having a fan mounting plate assembly affixed to said cradle back face;
- a triple redundant troubleshooting data indication system affixed to said cradle and electronically connected to said engine and said generator; and
- a triple redundant troubleshooting data transmission system affixed to said cradle and said engine.

2. The genset of claim 1 wherein said double redundant electric fan cooling system comprises:

two substantially similar two speed electric fans;

a generally planar removable fan mounting plate adapted for mechanical attachment to said support cradle back face wherein said plate has a top edge, a bottom edge and two side edges with a peripheral flange on said side and bottom edges, wherein said side edge flanges each have at least one locating orifice formed therethrough for engagement with said locating tab on said cradle, and said bottom edge flange has at least one bolt receiving orifice formed therethrough that aligns with said threaded recess of said cradle for receiving a bolt.

3. The genset of claim 2 wherein said fan mounting plate has at least two fan cutouts formed therethrough and at least two fan retention clips extending therefrom said plate.

4. The genset of claim 3 wherein said fans are mechanically constrained in a centered configuration behind said cutouts by said retention clips, and wherein said fan mounting plate is affixed to said cradle by engagement of said top edge of said plate underneath said locating flange of said cradle, by engagement of said locating tabs on said cradle with said locating orifices on said side edge flanges, and by threaded engagement of said bolt in said threaded recess of said cradle.

5. The genset of claim 4 wherein said double redundant electric fan cooling system has an electrical test circuit with visual status indication for electrical continuity of each of said fans at each of said dual speeds.

6. The genset of claim 1 wherein said triple redundant troubleshooting data indication system comprises:

an engine electronic control unit for receiving an input signal of engine parameter data from at least one engine parameter sensor and converting said input signal into an output signal;

a service and diagnostic unit for receiving at least two output signals from said electronic control unit;

and an OBD II port for receiving at least one output signal from said electronic control unit.

7. The genset of claim 6 wherein said output signal may be a diagnostic trouble code generated by said electronic control unit in preprogrammed response to a said engine parameter data input signal.

8. The genset of claim 7 wherein said service and diagnostic unit has a digital display means for the display of said output signal, an analog display means for the display of at least one output signal and a diagnostic code flash light for the visual display of said diagnostic trouble codes.

9. The genset of claim 8 wherein said triple redundant troubleshooting data transmission system comprises:

an OBD II port adapted for receiving output signals generated by said engine control unit, said port connected to a signal converter in series with a first cell phone;

a computer adapted for receiving output signals generated by said engine control unit, said computer connected to a satellite signal transmitting means and to a second cell phone; and a remote computing system for receiving a signal from said either of said first or second cell phone or said satellite;

wherein said output signals from said engine electronic control unit are transmitted wirelessly to said remote computing system.

10. The genset of claim 9 wherein said support cradle measures 34 inches long by 26 inches high by 25 inches deep and is adapted to be mechanically connected to the frame of a motorcoach so as to support said genset within said confined enclosure.

* * * * *